United States Patent

Brown et al.

[11] Patent Number: 6,079,594
[45] Date of Patent: *Jun. 27, 2000

[54] DISPENSING PACKAGE WITH A SELF-SEALING CLOSURE CONSTRUCTED FROM A THERMOPLASTIC MATERIAL

[75] Inventors: Paul E. Brown; Stuart R. Brown; John M. Hess, III, all of Midland; Timothy R. Socier, Essexville, all of Mich.

[73] Assignee: Seaquist Closures Foreign, Inc., Crystal Lake, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/915,960

[22] Filed: Aug. 21, 1997

[51] Int. Cl.[7] .................................................... B65D 35/08

[52] U.S. Cl. ........................... 222/107; 222/494; 264/259

[58] Field of Search ............................... 222/1, 105, 107, 222/494; 264/259, 266, 511

[56] References Cited

U.S. PATENT DOCUMENTS

| | | |
|---|---|---|
| 1,206,661 | 11/1916 | Booth . |
| 1,739,871 | 12/1929 | Smith . |
| 1,825,553 | 9/1931 | Smith . |
| 1,989,714 | 2/1935 | Statham ..................................... 221/60 |
| 2,147,164 | 2/1939 | Kent . |
| 2,175,052 | 10/1939 | Bull et al. ................................. 221/60 |
| 2,758,755 | 8/1956 | Schafler .................................... 222/213 |
| 2,904,225 | 9/1959 | Earles, Jr. . |
| 3,063,601 | 11/1962 | Hertz . |
| 3,342,379 | 9/1967 | Foley ........................................ 222/173 |
| 3,349,972 | 10/1967 | Whiteford . |
| 3,356,263 | 12/1967 | Monroe . |

(List continued on next page.)

FOREIGN PATENT DOCUMENTS

26719/88  9/1988  Australia .

| | | |
|---|---|---|
| 0 160 336 | 11/1985 | European Pat. Off. . |
| 174029 | 3/1986 | European Pat. Off. . |
| 082757 | 8/1986 | European Pat. Off. . |
| 079676 | 12/1986 | European Pat. Off. . |
| 0 226 290 A2 | 6/1987 | European Pat. Off. . |
| 111798 | 7/1988 | European Pat. Off. . |
| 554181 | 8/1993 | European Pat. Off. . |
| 405472 | 9/1993 | European Pat. Off. . |
| 0 442 379 | 11/1993 | European Pat. Off. . |
| 1 0 570 276 | 11/1993 | European Pat. Off. . |
| 586778 | 3/1994 | European Pat. Off. . |
| 591601 | 4/1994 | European Pat. Off. . |
| 324526 | 11/1994 | European Pat. Off. . |

(List continued on next page.)

OTHER PUBLICATIONS

European Patent Office Search Report RS 97946 Standard Recherchenbericht (Jan. 28, 1997).
European Patent Office Search Report RS 97946 Standard Recherchenbericht (Feb. 10, 1997).
"Multi–Material Injection Saves Time, While Cutting Cost," MODERN PLASTICS, Mar. 19, 1994 (Author: Peter Mapleston).
"Molding Many Parts Into One, " Product Design and Development, Dec. 19,1995, p. 16 (Author: Jay Rosenberg).
"Thermoplastic Elastomers, " MODERN PLASTICS,Mid–November 1995, pp.B–56 to B–58 (Author: Charles P. Radar).

Primary Examiner—Gregory L. Huson
Attorney, Agent, or Firm—Rockey, Milnamow & Katz, Ltd.

[57] ABSTRACT

A dispensing package for fluid products and the like comprises a container shaped to receive and retain a fluid product therein, and includes a discharge aperture therethrough. A self-sealing closure includes a marginal flange portion, and a head portion with an orifice which opens and closes in response to the application of a predetermined discharge pressure. The flange portion of the closure is positioned about and encloses the discharge aperture, and is constructed from a thermoplastic material, which is heat fused to the container to form a secure interconnection and fluid seal therebetween.

46 Claims, 6 Drawing Sheets

U.S. PATENT DOCUMENTS

| | | |
|---|---|---|
| 3,490,488 | 1/1970 | Grist .................................... 220/203 |
| 3,669,323 | 6/1972 | Harker et al. . |
| 4,166,553 | 9/1979 | Fraterrigo ............................. 222/181 |
| 4,408,702 | 10/1983 | Horvath ................................ 222/212 |
| 4,434,810 | 3/1984 | Atkinson ............................... 137/493 |
| 4,470,523 | 9/1984 | Spector ................................. 222/181 |
| 4,722,614 | 2/1988 | Boynton . |
| 4,728,006 | 3/1988 | Drobish et al. ...................... 222/181 |
| 4,749,108 | 6/1988 | Dornsbusch et al. ................ 222/212 |
| 4,794,750 | 1/1989 | Schmidt et al. ................. 264/266 X |
| 4,969,581 | 11/1990 | Seifert et al. . |
| 4,987,740 | 1/1991 | Coleman ............................... 220/203 |
| 4,991,745 | 2/1991 | Brown . |
| 5,008,066 | 4/1991 | Mueller . |
| 5,033,655 | 7/1991 | Brown .................................. 222/212 |
| 5,071,017 | 12/1991 | Stull . |
| 5,115,950 | 5/1992 | Rohr ..................................... 220/494 |
| 5,213,236 | 5/1993 | Brown . |
| 5,271,531 | 12/1993 | Rohr . |
| 5,307,955 | 5/1994 | Viegas ............................. 222/494 X |
| 5,339,995 | 8/1994 | Brown et al. . |
| 5,370,834 | 12/1994 | Sorensen . |
| 5,377,877 | 1/1995 | Brown et al. . |
| 5,390,805 | 2/1995 | Bilnani et al. . |
| 5,409,144 | 4/1995 | Brown et al. . |
| 5,439,124 | 8/1995 | Mock . |
| 5,439,143 | 8/1995 | Brown . |
| 5,447,673 | 9/1995 | Belvederi . |
| 5,472,122 | 12/1995 | Appleby . |
| 5,531,363 | 7/1996 | Gross . |
| 5,632,420 | 5/1997 | Lohrman et al. . |
| 5,743,443 | 4/1998 | Hins . |
| 5,839,614 | 11/1998 | Brown . |
| 5,927,566 | 7/1999 | Mueller . |

FOREIGN PATENT DOCUMENTS

| | | |
|---|---|---|
| 624525 | 11/1994 | European Pat. Off. . |
| 497961 | 12/1994 | European Pat. Off. . |
| 0 649 795 A2 | 4/1995 | European Pat. Off. . |
| 555623 | 11/1995 | European Pat. Off. . |
| 0 713 832 | 5/1996 | European Pat. Off. . |
| 734960 | 10/1996 | European Pat. Off. . |
| 0 841 258 A2 | 5/1998 | European Pat. Off. . |
| 673584 | 1/1930 | France . |
| 996998 | 12/1951 | France . |
| 1135210 | 4/1957 | France . |
| 2284533 | 7/1976 | France . |
| 2 729 925 | 2/1985 | France . |
| 2661127 | 10/1991 | France . |
| 2128875 | 12/1972 | Germany . |
| 23 41 935 | 3/1975 | Germany . |
| 23 41 936 | 3/1975 | Germany . |
| 23 54 093 | 5/1975 | Germany . |
| 2609310 | 9/1976 | Germany . |
| 23 41 934 | 2/1983 | Germany . |
| 3347079 | 7/1985 | Germany . |
| 93 07 083 | 5/1993 | Germany . |
| 44 03 082 | 4/1995 | Germany . |
| 29 508 151 | 8/1995 | Germany . |
| 44 03 080 | 8/1995 | Germany . |
| 44 03 081 | 8/1995 | Germany . |
| 195 10 007 | 10/1995 | Germany . |
| 44 17 569 | 11/1995 | Germany . |
| 44 40 211 | 2/1996 | Germany . |
| 196 13 130 | 3/1997 | Germany . |
| 58-73738 | 5/1983 | Japan . |
| 273469 | 4/1982 | Spain . |
| 274526 | 4/1982 | Spain . |
| 286370 | 10/1984 | Spain . |
| 291588 | 1/1986 | Spain . |
| 1028503 | 7/1994 | Spain . |
| 1046518 | 10/1966 | Switzerland . |
| 145824 | 6/1962 | U.S.S.R. . |
| 2098958 | 12/1982 | United Kingdom . |
| 0278125 | 8/1988 | United Kingdom . |
| 0395380 | 10/1990 | United Kingdom . |
| WO 91/12951 | 9/1991 | WIPO . |
| WO 92/18318 | 10/1992 | WIPO . |
| WO 95/28274 | 10/1995 | WIPO . |
| WO 95/29806 | 11/1995 | WIPO . |
| WO 95/34500 | 12/1995 | WIPO . |
| WO 96/24483 | 8/1996 | WIPO . |
| WO 97/08979 | 3/1997 | WIPO . |

DISPENSING PACKAGE WITH A SELF-SEALING CLOSURE CONSTRUCTED FROM A THERMOPLASTIC MATERIAL

BACKGROUND OF THE INVENTION

The present invention relates to packaging for fluid products and the like, and in particular to a dispensing package and method for making the same.

Many different types of packages or containers are presently available for packaging non-solid products of the type which are capable of flowing, such as fluid or fluidized materials, including liquids, pastes, powders, and the like, which substances are collectively and generically referred to herein as "fluids". Some such packages include a dispenser which permits a selected amount of fluid to be discharged from the package, and then reseals to close the package.

Self-sealing dispensing valves have been used in packaging for certain types of products, such as the container disclosed in U.S. Pat. No. 4,728,006 to Drobish et al, which is designed for shampoos, conditioners, and the like. However, such valves have been known to experience some types of sealing problems, and inconsistent dispensing characteristics, particularly when the packages are exposed to significant temperature variations.

Liquid silicone rubber valves have recently been used in some types of packaging, and have proven particularly advantageous since the material is inherently quite inert, and will therefore not either adulterate or react with the packaged product. Examples of such packaging are provided in Applicant's U.S. Pat. Nos. 5,033,655; 5,213,236; 5,377,877 and 5,409,144 to Brown et al, which are incorporated herein by reference.

Although liquid silicone rubber possesses many attributes for use in packaging, it also has other characteristics which render such applications problematic. For example, the surfaces of liquid silicone rubber parts are extremely tacky or sticky, having a very high coefficient of friction. As a result, handling the same is difficult, and in attempting to attach a dispensing valve to a container by a conventional threaded collar arrangement, the surfaces of the valve flange will stick tightly to the adjacent surfaces of the container and collar before the collar can be tightened securely enough to create a leak-resistant seal. Tightening of the collar often causes the valve flange, as well as the entire valve to distort from its designed shape, thereby preventing the formation of a secure seal, and/or changing the intended dispensing and sealing characteristics of the valve.

Another drawback associated with the use of liquid silicone rubber in dispensing valves for product packaging is that it cannot be heat fused. Also, there is presently no available technology to quickly and reliably adhere a liquid silicone valve to a container, at least without substantial preparation, so as to render high speed commercial assembly impractical at this time.

SUMMARY OF THE INVENTION

One aspect of the present invention is a dispensing package for fluid products and the like, which includes a container shaped to receive and retain a fluid product therein, with a discharge aperture therethrough. A self-sealing closure includes a marginal flange portion, and a head portion with an orifice which opens and closes in response to the application of a predetermined discharge pressure. The flange portion of the closure is positioned about and encloses the discharge aperture, and is constructed from a thermoplastic material, which is heat fused to the container to form a secure interconnection and fluid seal therebetween.

Another aspect of the present invention is a dispensing assembly for fluid product packages and the like, of the type including a container shaped to receive and retain a fluid product in an interior portion thereof, with a discharge aperture therethrough. A self-sealing closure includes a marginal flange portion, and a head portion with an orifice which opens and closes in response to the application of a predetermined discharge pressure. A dispensing panel constructed from a thermoplastic material includes a discharge aperture therethrough. The flange portion of the closure is positioned about and encloses the discharge aperture, and is constructed from a thermoplastic material which is heat fused to the dispensing panel to form a secure interconnection and fluid seal therebetween.

Yet another aspect of the present invention is a method for making dispensing packages for fluid products and the like, comprising forming a container shaped to receive and retain a fluid product in an interior portion thereof. A discharge aperture is formed through the container. A self-sealing closure is provided of the type having a marginal flange and a head portion with an orifice extending therethrough, which opens to permit fluid flow therethrough in response to communication with predetermined discharge pressure, and closes to shut off fluid flow therethrough upon removal of the predetermined discharge pressure. The flange portion of the closure is positioned about the discharge opening in the container to enclose the same. The flange portion of the closure is heat fused to the container to form a secure interconnection and fluid seal therebetween.

Yet another aspect of the present invention is a method for making dispensing packages and the like, comprising providing an elongate strip of heat sealable material for forming at least dispense panels for associated containers of the type including reservoirs. Apertures are formed in the strip to define package discharge openings. Thermoplastic closures are molded in-situ directly on the strip, and wherein the closures have head portions, and marginal flange portions which are formed about and enclose the discharge openings in the strip. The head portions of the closures are slit to form orifices, which open to permit fluid flow therethrough in response to communication with a predetermined discharge pressure, and close to shut off fluid flow therethrough upon removal of the predetermined discharge pressure. The strip is cut to form dispense panel assemblies, wherein each comprises at least one of the dispense panels with at least one of the closures molded thereon. The dispense panel assemblies are connected with the reservoirs to form dispensing packages, wherein liquid product in the container can be dispensed either directly through the closure orifice by applying pressure to the container, or indirectly by inserting a straw through the closure orifice and applying the vacuum to the straw.

The principal objectives of the present invention are to provide a dispensing package having an inexpensive construction which will not leak. The dispensing package has a self-sealing closure with an orifice that is preferably shaped such that liquid product in the container can be dispensed either directly through the closure orifice by applying a discharge pressure to the interior of the container, or indirectly by inserting a straw through the closure orifice and applying a vacuum to the straw. The closure may be molded in-situ directly on a strip of thermoplastic material to minimize parts handling. The closure orifices are preferably formed while the closures are still attached to a continuous strip of container material, so as to achieve accurate location of the orifices in the closure heads. The entire package may be constructed from a strip of heat sealable material, such that fabrication of the package can be fully automated to further reduce costs.

These and other advantages of invention will be further understood and appreciated by those skilled in the art by reference to the following written specification, claims and appended drawings.

DETAILED DESCRIPTION OF THE PREFERRED EMBODIMENTS

Figure 1:
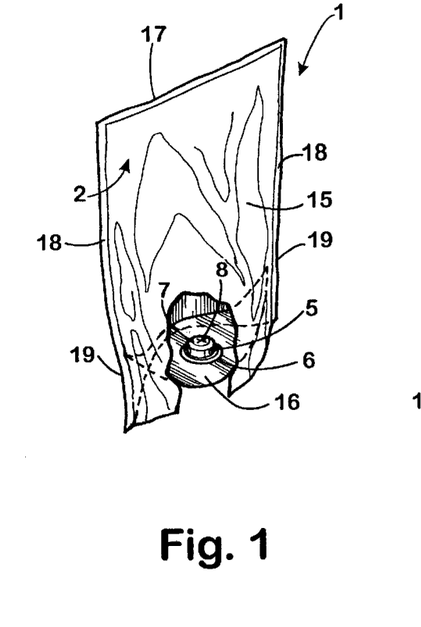
FIG. 1 is a perspective view of a dispensing package embodying the present invention, with a portion thereof broken away to reveal internal construction.

For purpose of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1–4) generally designates a dispensing package embodying the present invention. Dispensing package 1 is particularly designed and adapted for use in conjunction with fluid products, such as juices, ice tea, punches and other similar products. Dispensing package 1 includes a container 2, which is shaped to receive and retain the fluid product therein, and includes a discharge aperture or opening 4 therethrough. A self-sealing closure 5 includes a marginal flange portion 6 and a head portion 7 with an orifice 8, which opens and closes in response to the application of a predetermined discharge pressure. The flange portion 6 of closure 5 is positioned about and encloses the discharge opening 4 of dispensing package 1, and is constructed from a thermoplastic material, which is heat fused to the dispensing package 1 to form a secure interconnection and fluid seal therebetween.

The illustrated dispensing package 1 is in the nature of a stand-up bag or pouch, and is constructed from a strip of relatively thin, heat sealable material, such as a laminate sheet or film, and includes a pouch portion 15, and a bottom panel 16 in which the discharge opening 4 of dispensing package 1 is disposed. As explained in greater detail hereinafter, the illustrated pouch portion 15 of dispensing package 1 may be formed by interconnecting strips of relatively thin, flexible, heat sealable material by continuous heat sealed connections or joints 17 at the top of container 2, and 18 along the opposite side edges 19 of container 2.

As described in greater detail hereinafter, the illustrated bottom panel 16 of dispensing package 1 may also be formed from a strip 22 (FIGS. 5–8) of relatively thin, flexible, heat sealable material, such as a laminate sheet or film. In the illustrated example, the discharge openings 4 have a circular plan shape, and are positioned in a predetermined, spaced apart relationship along the longitudinal center line of the strip 22.

In the illustrated example, the self-sealing valve or closure 5 (FIGS. 4A–4C) has a shape which is substantially similar to the dispensing valve disclosed in related U.S. Pat. No. 5,213,236, and includes a resiliently flexible connector sleeve portion 25, which has one end portion thereof connected with the flange portion 6 of closure 5, and an opposite end portion thereof connected with the head portion 7 of closure 5. As discussed in the Brown et al U.S. Pat. No. 5,213,236, the closure 5 assumes a generally concave orientation when orifice 8 is in a fully closed position (FIG. 4A), and a convex orientation when orifice 8 is in a fully open condition (FIG. 4C). The connector sleeve portion 25 of closure 5 permits the head portion 7 of closure 5 to reciprocate between the fully open and fully closed positions. The connector sleeve 25 of the illustrated closure 5 has a J-shaped, longitudinal, cross-sectional shape, and the head portion 7 has a tapered thickness, wherein the inner portion of the head portion 7 disposed adjacent orifice 8 is thinner than the outer portion of the head portion 7. The illustrated head portion 7 has an arcuately shaped inner surface 26 and an arcuately shaped outer surface 27, wherein the inner surface 26, which communicates with the fluid product, has a radius greater than the outer surface 27, which communicates with ambient environment.

The illustrated self sealing closure 5 is in the form of a one-piece valve, having a hat-shaped side elevational configuration in its as molded or normal condition. The resilient flexibility of connector sleeve portion 25 permits the same to double over and then extend rollingly, in the nature of a rolling diaphragm with valve head portion 7 mounted at the center thereof in a manner which permits valve head portion 7 to shift or float freely inwardly and outwardly in an axial direction with respect to the discharge opening 4 in container 2.

The reciprocating motion of valve head portion 7 and flexible connector sleeve portion 25 provides dispensing package 1 with several important advantages. For example, connector sleeve portion 25 is preferably configured with sufficient flexibility that abnormal pressure increases developed within the interior of container 2, such as those caused by thermoexpansion, vibrations, shock impact forces, and the like are offset by the axial shifting motion of valve head portion 7 with respect to marginal flange portion 6, so as to alleviate excess pressure on discharge orifice 8.

Another example of the benefits achieved by the reciprocating motion of valve head portion 7 on connector sleeve portion 25 is that connector sleeve portion 25 is preferably configured with sufficient flexibility that any misalignments and/or distortions of the valve flange portion 6 are not transmitted to the valve head portion 7, thereby permitting unhindered operation of discharge orifice 8. The flexible connector sleeve portion 25 tends to insulate or isolate the valve head portion 7 from marginal flange portion 6, such that it can float freely, and thereby avoid problems associated with distortion of the orifice 8 or valve head portion 7. This feature is particularly important in the illustrated dispensing package, wherein container 2 is constructed from a highly flexible material, such as the illustrated laminate sheet of foil or film. When pressure is applied to the container 2 to dispense fluid product therefrom, the bottom panel 16 can distort, particularly as the dispensing package approaches an empty condition. The flexible nature of connector sleeve portion 25 permits valve head portion 7 to reciprocate freely, even when bottom panel 16 becomes distorted, thereby ensuring good flow characteristics, and avoiding leakage.

Figure 4:
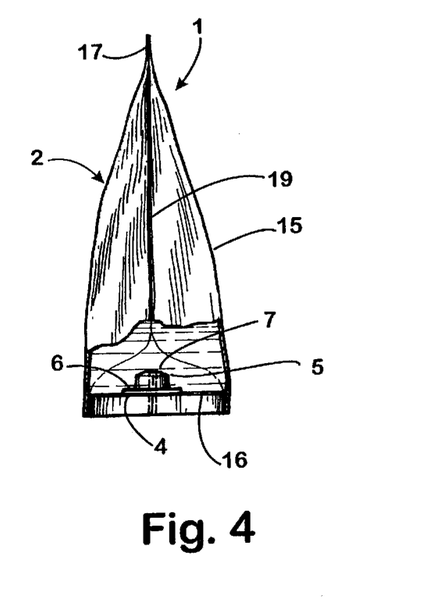
FIG. 4 is a side elevational view of the dispensing package, wherein a portion thereof is broken away to reveal internal construction.
Figure 4A:
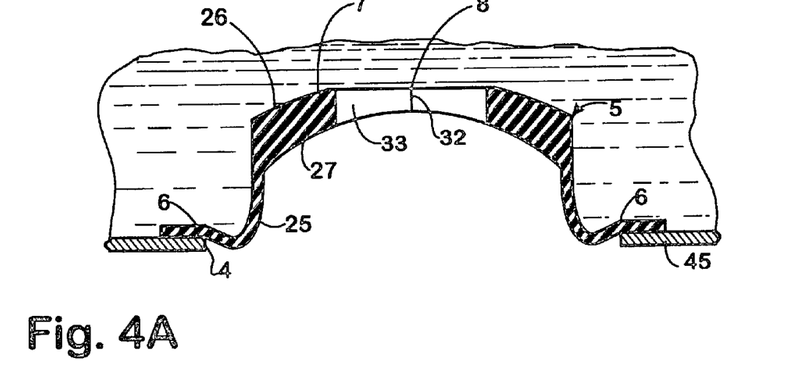
FIG. 4A is an enlarged, fragmentary, cross-sectional view of the dispensing package, showing a self-sealing closure portion thereof in a fully closed and fully retracted position.
Figure 4B:
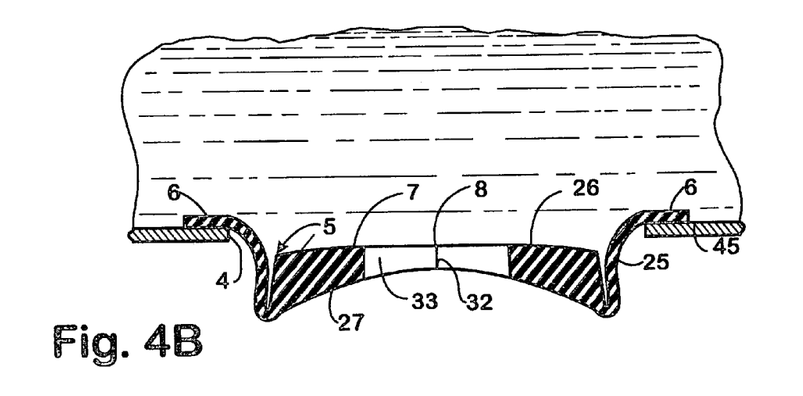
FIG. 4B is an enlarged, fragmentary, cross-sectional view of the dispensing package, showing the closure in a fully closed and fully extended position.
Figure 4C:
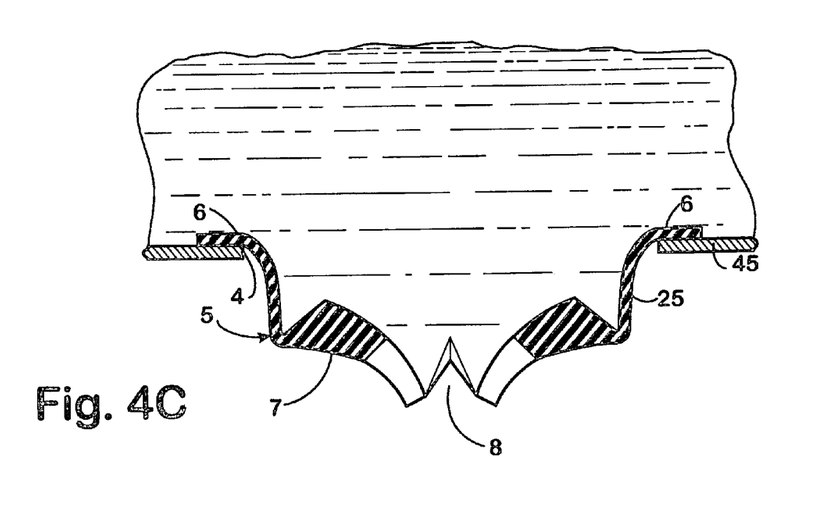
FIG. 4C is an enlarged, fragmentary, cross-sectional view of the dispensing package, showing the closure in a fully open and fully extended position.

Yet another benefit achieved by the reciprocating motion of valve head portion 7 is that connector sleeve portion 25 is preferably configured with sufficient flexibility that a fairly moderate pressure (i.e., one which is substantially lower than the predetermined opening pressure of orifice 8) is required to shift the valve head portion 7 from the closed and fully retracted position shown in FIG. 4A to the closed and fully extended position shown in FIG. 4C, thereby improving the dispensing "feel" of dispensing package 1. When the user grasps container 2 and applies force to the sidewalls, the pressure generated within the interior of the container causes the valve head portion 7 to shift on flexible connector sleeve portion 25 between the closed and fully retracted position shown in FIG. 4A to the closed and fully extended position shown in FIG. 4B, at which point valve head portion 7 halts momentarily, and further movement of the valve head portion 7 is resisted until additional forces are exerted on container 2, which requires in an internal pressure within container 2 greater than the predetermine opening pressure of orifice 8. This motion of flexible connector sleeve portion 25 and valve head portion 7 is sensed by the user through touch or feel, typically in the form of a vibration or ripple experienced in the container sidewalls when valve head portion 7 reaches the closed, fully extended position (FIG. 4B). The ripple motion signals the user to that valve head portion 7 is fully extended, and that further pressure will cause orifice 8 to snap open and dispense fluid product. When orifice 8 snaps open and closed, similar vibrations or ripples are communicated to the user through the container sidewalls to assist in achieving accurate flow control.

While the shape of the illustrated self-sealing closure 5 is similar to that disclosed in the Brown et al U.S. Pat. No. 5,213,236, the present self-sealing closure 5 is constructed from a thermoplastic material, instead of the liquid silicone rubber material preferably used in conjunction with the prior Brown et al valve. By using a thermoplastic material, at least in the flange portion 6 of closure 5, closure 5 can be heat fused to the dispensing package 1 in the manner discussed in greater detail below.

In one working embodiment of the present invention, closure 5 is constructed from a thermoplastic rubber compound, such as a blended Kraton brand polymer, and in particular, that sold under the designation or brand name Dynaflex G2735.

Figure 2:
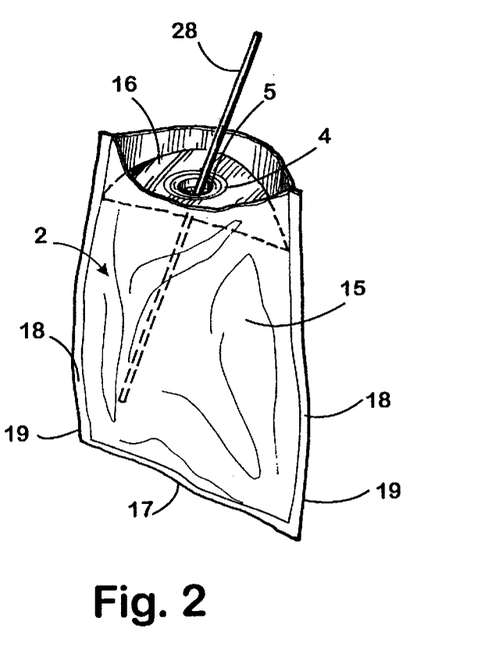
FIG. 2 is another perspective view of the dispensing package, with a portion thereof broken away to reveal internal construction.
Figure 3:
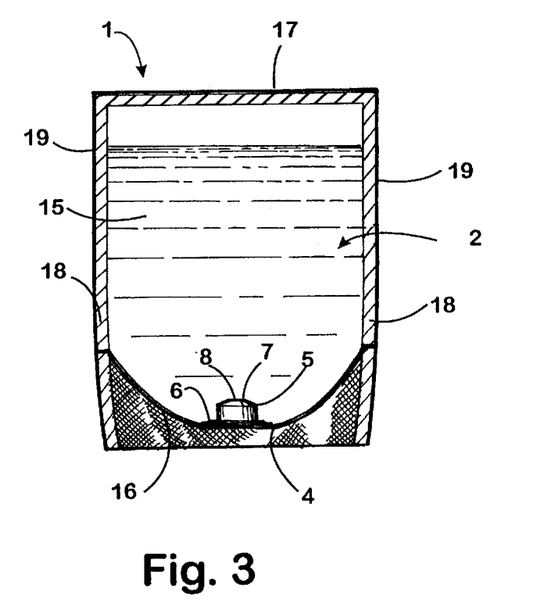
FIG. 3 is a vertical, cross-sectional view of the dispensing package.

In operation, a filled dispensing package 1 can be used to dispense the fluid product by simply applying a pressure to the pouch portion 15 of the dispensing package 1 sufficient to shift the head portion 7 of closure 5 to the fully open position, and open the orifice portion 8 of closure 5. A stream of the fluid product is thereby dispensed from the dispensing package 1, which can be directed into an appropriate drinking vessel, or directly into the mouth of the user. Alternatively, as shown in FIG. 2, a straw 28 may be inserted through the closure orifice 8 and fluid extracted from the dispensing package 1 by applying a vacuum to the straw 28.

Figure 5:
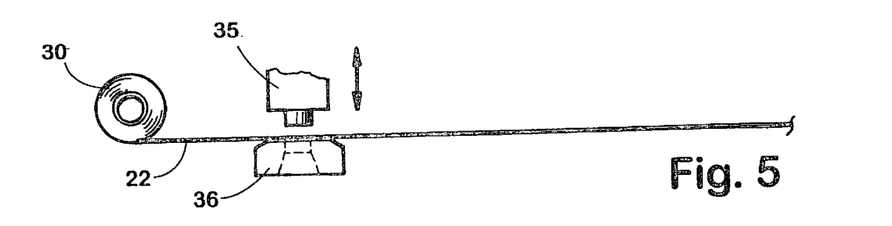
FIG. 5 is a partially schematic illustration of a method for making the dispensing package embodying the present invention, wherein discharge apertures are formed through a strip of heat sealable material.
Figures 6, 7:
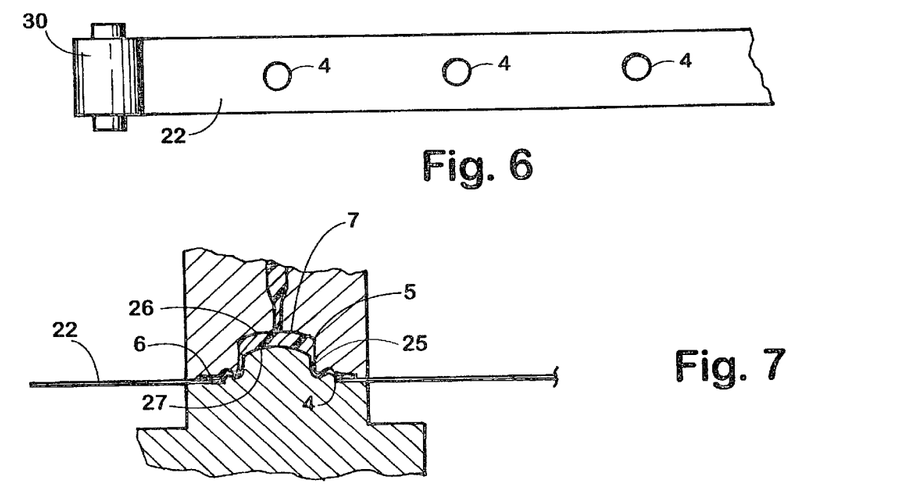
FIG. 6 is a partially schematic top plan view of the formed strip shown in FIG. 5.
FIG. 7 is a partially schematic, cross-sectional view of a closure being formed in-situ on the formed strip.
Figure 8:
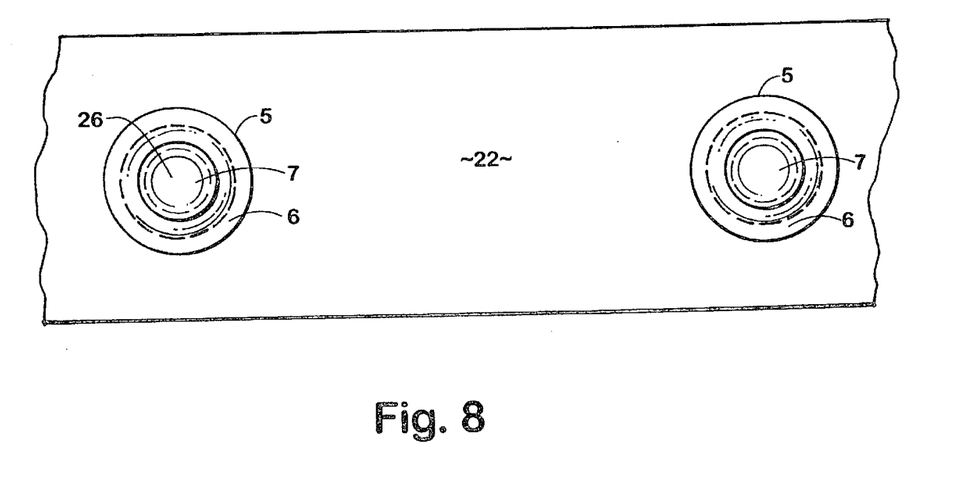
FIG. 8 is a partially schematic top plan view of the strip after the closures have been molded thereon.
Figure 9:
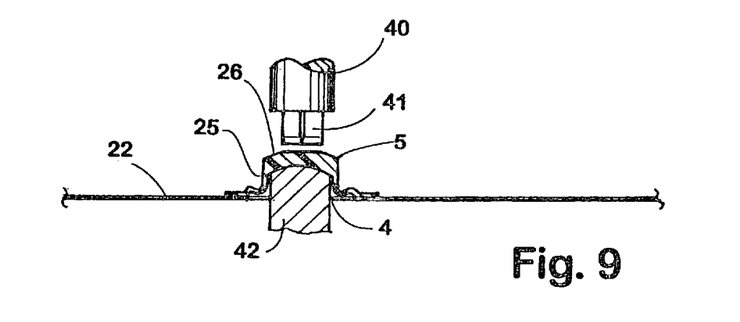
FIG. 9 is a partially schematic, vertical, cross-sectional view of a process step forming orifices in the closures.
Figure 10:
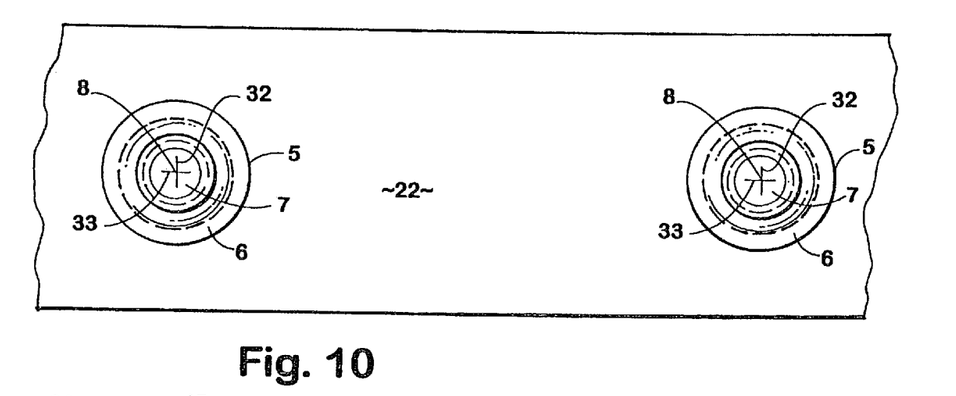
FIG. 10 is a partially schematic top plan view of the strip after the orifices have been formed.

FIGS. 5–16 schematically illustrate a method embodying the present invention for making dispensing package 1. With reference to FIG. 5, a roll 30 of relatively thin, flexible, heat sealable material is provided, which is paid out off of the roll to form the flat strip 22. The discharge openings 4 are first formed in the strip 22 at regular intervals along the longitudinal center line of strip 22 by means such as the illustrated cutting or punch operation, which includes mating cutter die parts 35 and 36. The perforated strip 22 is then fed to the next station, where the self-sealing closures 5 are attached to the perforated strip 22. In the example illustrated in FIG. 7, each closure 5 is molded in-situ directly on the strip 22, which will ultimately form the bottom panel 16 of dispensing package 1. Each closure 5 is positioned concentrically about an associated discharge opening 4, such that the flange portion 6 of the closure 5 encloses the associated discharge opening 4. In the example illustrated in FIG. 7, the entire closure 5 is molded from the same thermoplastic material, such that the flange portion 6 of closure 5 is automatically and integrally heat fused to the bottom panel 16. The strip 22 with closures 5 formed or otherwise mounted thereon, in the form shown in FIG. 8, is then transported to a slitting station, as shown in FIG. 9, where the orifices 8 are formed.

In the example shown in FIG. 9, the head portions 7 of the closures 5 molded onto continuous strip 22 are slit to form a cross-slit orifices 8, wherein two slits 32 and 33 (FIG. 10) are positioned in a mutually perpendicular relationship. The valve orifice 8, shown in FIG. 9, is formed by a cutter die 40 having X-shaped knives 41 in the shape of the desired cross-slit. A backer die 42 is positioned against the outer surface 27 of the valve head 7 to ensure complete slitting. Other techniques can also be used to form orifices 8, such as laser cutting or the like. By performing the orifice forming operation while the closures 5 are still mounted to the continuous strip 22 helps ensure proper positioning of the orifice 8 in each valve head 7 even during high speed manufacture, and ensures proper registry therebetween.

Figure 11:
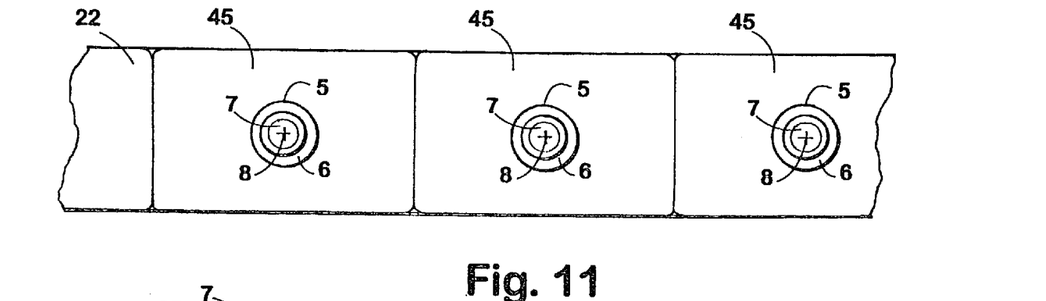
FIG. 11 is a partially schematic top plan view of the strip being cut to length to form bottom panels for the packages.
Figures 12, 13:
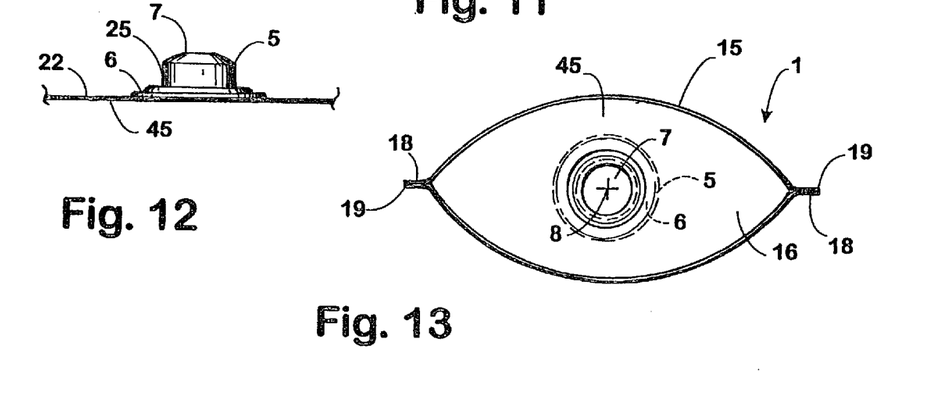
FIG. 12 is a fragmentary side elevational view of a bottom panel assembly.
FIG. 13 is a bottom plan view of an assembled dispensing package.

As illustrated in FIG. 11, after the closures 5 have been slit or otherwise processed to form the associated orifices 8, the continuous strip 22 is cut to length to form individual assemblies 45, which in the illustrated example, will ultimately be mounted to the pouch portions 15 of the dispensing packages 1.

It is to be understood that the individual assemblies 45 can be used in a wide variety of packaging applications, including attachment to a container liner, sidewall, corner, or the like.

It is to be understood that the present invention also contemplates mounting an already formed self-sealing closure 5 on continuous strip 22 by heat fusing the flange portion 6 of the closure 5 to the bottom panel 16. Conventional heat fusing or sealing equipment, including ultrasonic devices, may be used to heat fuse the flange portion 6 of closure 5 to the bottom panel 16 to form a secure interconnection and fluid seal therebetween. One disadvantage associated with the assembly of pre-manufactured closures 5 onto the continuous strip 22 involves the extra handling of closures 5, and ensuring their proper orientation about the discharge openings 4 in the strip 22. This drawback is solved by molding closures 5 in-situ directly on the continuous strip 22.

Figure 14:
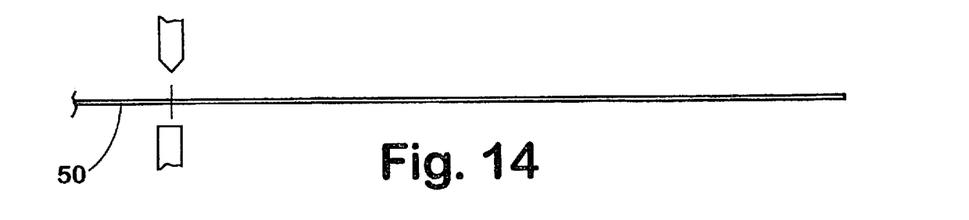
FIG. 14 is a partially schematic side elevational view of a packaging strip being formed into a pouch.
Figure 15:
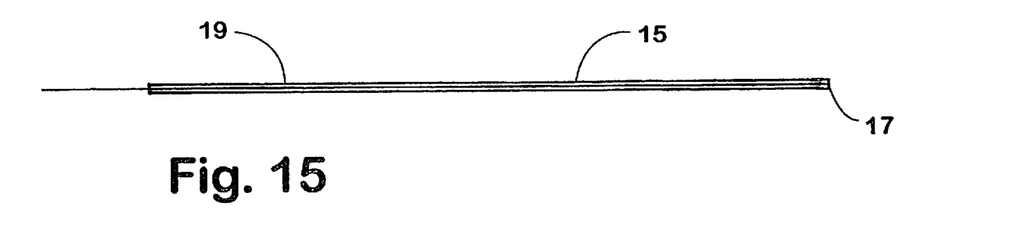
FIG. 15 is a partially schematic side elevational view of the packaging strip, wherein the sides of the package have been heat sealed together.

FIGS. 14 and 15 schematically illustrate a method for making the illustrated pouch portion 15 of dispensing package 1. A strip 50 of heat sealable material, preferably the same as the bottom panel strip 22, is first cut to form two similar panels 51 and 52, which are positioned in an overlying relationship, as shown in FIG. 15. The side edges 19 of panels 51 and 52 are heat sealed together along connection lines 18 to form the opposite sides of the pouch portion 15.

As will be appreciated by those skilled in the art, the bottom panel assemblies 45, with closures 5 formed thereon, can be used in conjunction with a wide variety of different types of containers or pouches, and not just the illustrated stand-up bag type dispensing package 1 shown in FIGS. 1–4.

Figure 16:
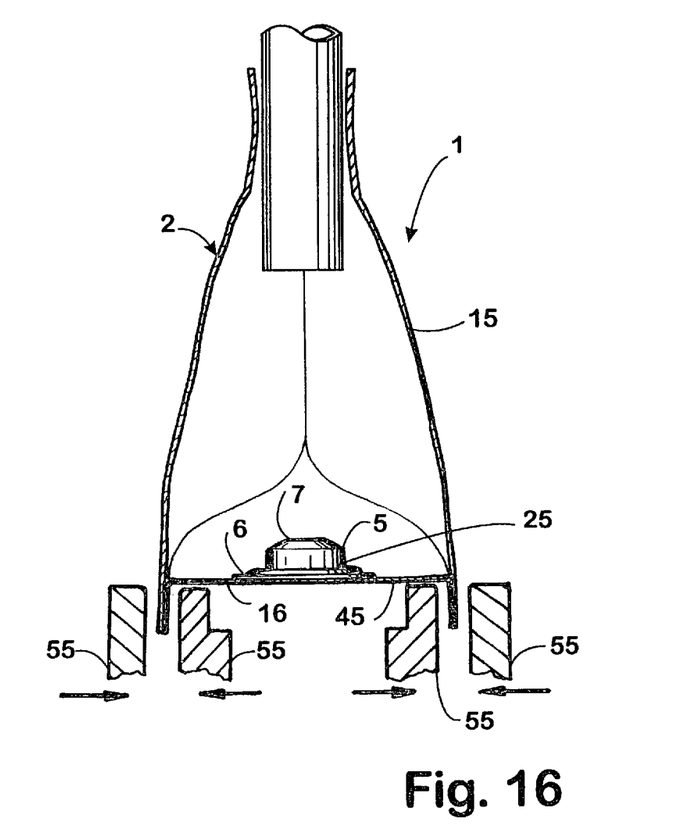
FIG. 16 is a partially schematic, vertical, cross-sectional view of a method for mounting the lower panel assemblies in an associated package pouch, and wherein the assembled package is being filled with fluid product.

FIG. 16 illustrates one method for further fabricating the dispensing package 1, by assembling the bottom panel assemblies 45 to the pouch portions 15 of the dispensing packages 1. In the illustrated example, a bottom panel 16 is assembled in the open end of an associated pouch 15, with the free ends of the same formed in an overlapping relationship (FIG. 16) at the bottom of dispensing package 1, as viewed in FIG. 1. Since both the bottom panel assembly 45 and pouch portion 15 are constructed from a thermoplastic material, heat seal dies 55, or the like, can be used to fuse the free edges of the bottom panel assembly 45 and the pouch portion 15 together to complete the dispensing package 1.

Once a bottom panel assembly 45 is securely attached to an associated pouch portion 15 of container 2, the container can be filled, such as through the open upper end of the pouch portion 15, as shown in FIG. 16. After the container 2 has been filled, the upper edges of panels 51 and 52 are heat sealed together along connection line 17 to complete the package.

A removable, tape-like travel seal (not shown) may be applied over the orifice portion 8 of closure 5 to prevent inadvertent leakage during shipment, or the like. The travel seal may also be formed prior to filling the container 2 with fluid product.

The present invention also contemplates other package fabrication techniques and/or methods. For example, instead of folding the outer periphery of the bottom panel assembly 45 over, it can be heat fused to the open end of the pouch 15 in a flat condition, and the fused assembly then folded down to the shape shown in FIGS. 1–4. Heat fused connections (not shown) can be applied to the free lower edges of the formed package to retain the stand-up pouch-like shape of the package 1.

Figure 17:
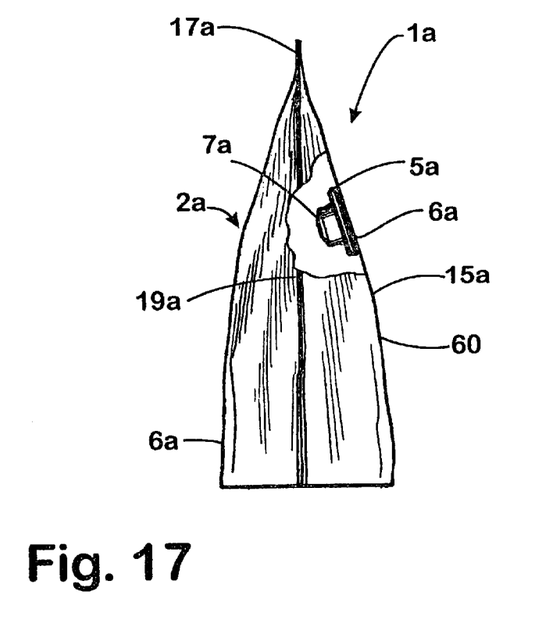
FIG. 17 is a side elevational view of another embodiment of the present dispensing package, with a portion thereof broken away to reveal internal construction.

The reference numeral 1a (FIG. 17) generally designates another embodiment of the present invention. Since dispensing package 1a is similar to the previously described dispensing package 1, similar parts appearing in FIGS. 1–16 and 17, respectively, are represented by the same, corresponding reference numeral, except for the suffix "a" in the numerals of the latter. In dispensing package 1a, self-sealing closure 5a is mounted on the sidewall 60 of the container pouch portion 15a. In dispensing package 1a, the pouch portion sidewall 60 is constructed from a thermoplastic material, so as to facilitate either forming or mounting closure 5a thereon. While package 1a can be dispensed either directly through the closure orifice 8a by applying pressure to container 2a, or indirectly by inserting a straw through the closure orifice and applying a vacuum to the straw, it is particularly adapted for dispensing through the use of a straw.

Figure 18:
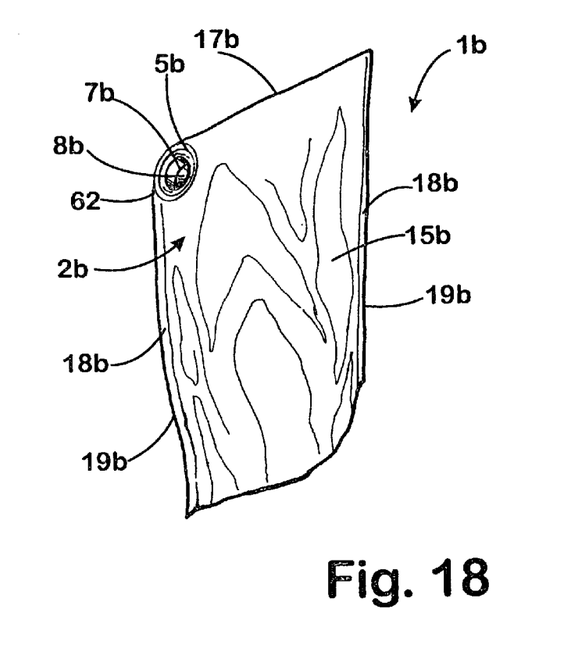
FIG. 18 is a perspective view of yet another embodiment of the present dispensing package.

The reference numeral 1b (FIG. 18) generally designates yet another embodiment of the present invention. Since dispensing package 1b is similar to the previously described dispensing package 1, similar parts appearing in FIGS. 1–16 and 18, respectively, are represented by the same, corresponding reference numeral, except for the suffix "b" in the numerals of the latter. In dispensing package 1b, the self-sealing closure 5 is located in an upper corner portion 62 of the container pouch 15b. The pouch portion 15b of container 2b, in which closure 5b is disposed, is constructed from a thermoplastic material to facilitate interconnection therebetween. The corner location of closure 5b in dispensing package 1b is particularly adapted for dispensing liquid product directly into the mouth of the user.

The illustrated dispensing packages, and associated methods for making the same, provide a relatively inexpensive construction which will not leak. The liquid product in the container can be dispensed either directly through the closure orifice by applying a discharge pressure to the interior portion, or indirectly by inserting a straw through the closure orifice and applying a vacuum to the straw.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are as follows:

We claim:

1. A dispensing package for fluid products and the like, comprising:
   a container shaped to receive and retain a fluid product in an interior portion thereof, and including a discharge aperture threrethrough;
   a self-sealing closure comprising a marginal flange portion and a head portion with an orifice extending therethrough which opens to permit fluid flow therethrough in response to communication with a predetermined discharge pressure; and wherein
      said flange portion of said closure is positioned about and encloses said discharge aperture, and said closure is constructed as a single, uninterrupted piece from a thermoplastic material which is heat fused to said container to form a secure interconnection and fluid seal therebetween.

2. A dispensing package as set forth in claim 1, wherein:
   said closure is molded in-situ directly on said container from a thermoplastic material.

3. A dispensing package as set forth in claim 2, wherein:
   said container has a multi-piece construction comprising a pouch portion and a panel portion; and
   said closure is disposed on one of said pouch portion and said panel portion.

4. A dispensing package as set forth in claim 3, wherein:
   said closure is disposed adjacent a corner of said pouch portion.

5. A dispensing package as set forth in claim 3, wherein:
   said closure is disposed on a sidewall of said pouch portion.

6. A dispensing package as set forth in claim 3, wherein:
   said panel portion defines a bottom panel; and
   said closure is disposed on said bottom panel.

7. A dispensing package for fluid products and the like, comprising:
   a container shaped to receive and retain a fluid product in an interior portion thereof, and including a discharge aperture therethrough, said container having a multi-piece construction comprising a pouch portion and a panel portion;
   a self-sealing closure comprising a marginal flange portion and a head portion with an orifice extending therethrough which opens to permit fluid flow therethrough in response to communication with a predetermined discharge pressure, said closure molded in-situ directly on said container from a thermoplastic material, said panel portion defines a bottom panel and said closure is disposed on said bottom panel; and wherein
      said closure is formed on said container bottom panel before connecting the same to said pouch portion of said container, said flange portion of said closure is positioned about and encloses said discharge aperture, and is constructed from a thermoplastic material which is heat fused to said container to form a secure interconnection and fluid seal therebetween.

8. A dispensing package as set forth in claim 7, wherein:
   said container bottom panel is formed from an elongate strip of thin heat sealable material; and
   said container pouch portion is formed from an elongate strip of heat sealable material.

9. A dispensing package as set forth in claim 8, wherein:
   said container bottom panel is connected to said container pouch portion by a heat sealed connection.

10. A dispensing package as set forth in claim 9, wherein:
    said closure orifice is configured such that the liquid product in said container can be dispensed either directly through said closure orifice by applying said discharge pressure to the interior portion of said container, or indirectly by inserting a straw through said closure orifice and applying a vacuum to the straw.

11. A dispensing package as set forth in claim 10, wherein:
    said closure orifice comprises at least one slit through said head portion of said closure.

12. A dispensing package as set forth in claim 11, wherein:
    said closure orifice comprises at least two mutually intersecting slits through said head portion of said closure.

13. A dispensing package as set forth in claim 12, wherein:
    said closure includes a resiliently flexible connector sleeve portion with one end portion thereof connected with said flange portion, and an opposite end portion thereof connected with said head portion.

14. A dispensing package as set forth in claim 13, wherein:
    said closure assumes a generally concave orientation when said orifice is in a fully closed condition.

15. A dispensing package as set forth in claim 14, wherein:
    said connector sleeve has a generally J-shaped, longitudinal, cross-sectional shape; and
    said head portion has a tapered construction.

16. A dispensing package as set forth in claim 1, wherein:
    said container has a multi-piece construction comprising a pouch portion and a panel portion; and
    said closure is disposed on one of said pouch portion and said panel portion.

17. A dispensing package as set forth in claim 16, wherein:
    said closure is disposed adjacent a corner of said pouch portion.

18. A dispensing package as set forth in claim 16, wherein:
    said closure is disposed on a sidewall of said pouch portion.

19. A dispensing package as set forth in claim 16, wherein:
    said panel portion defines a bottom panel; and
    said closure is disposed on said bottom panel.

20. A dispensing package as set forth in claim 1, wherein:
    said container is formed from an elongate strip of thin, heat sealable material.

21. A dispensing package as set forth in claim 1, wherein:
    said closure orifice is configured such that the liquid product in said container can be dispensed either directly through said closure orifice by applying said discharge pressure to the interior portion of said container, or indirectly by inserting a straw through said closure orifice and applying a vacuum to the straw.

22. A dispensing package as set forth in claim 1, wherein:
    said closure orifice comprises at least one slit through said head portion of said closure.

23. A dispensing package as set forth in claim 1, wherein:
    said closure orifice comprises at least two mutually intersecting slits through said head portion of said closure.

24. A dispensing package as set forth in claim 1, wherein:
said closure includes a resiliently flexible connector sleeve portion with one end portion thereof connected with said flange portion, and an opposite end portion thereof connected with said head portion.

25. A dispensing package as set forth in claim 1, wherein:
said closure assumes a generally concave orientation when said orifice is in a fully closed condition.

26. A dispensing package for fluid products and the like, comprising:
a container shaped to receive and retain a fluid product in an interior portion thereof, and including a bottom portion with a discharge aperture therethrough;
a self-sealing closure comprising a marginal flange portion and a head portion with an orifice extending therethrough, which opens to permit fluid flow therethrough in response to communication with a predetermined discharge pressure; and wherein
said flange portion of said closure is positioned about and encloses said discharge aperture in said container bottom portion, and said closure is constructed as a single, uninterrupted piece from a thermoplastic material which is heat fused to said container to form a secure interconnection and fluid seal therebetween, whereby the liquid product in said container can be dispensed either directly through said closure orifice by applying said discharge pressure to the interior portion of said container; or indirectly by inserting a straw through said closure orifice and applying a vacuum to said straw.

27. A dispensing package as set forth in claim 26, wherein:
said closure is molded in-situ directly on said container bottom portion from a thermoplastic material.

28. A dispensing package as set forth in claim 27, wherein:
said container has a multi-piece construction comprising a pouch portion and a bottom panel defining said bottom portion; and
said closure is formed on said container bottom panel.

29. A dispensing package for fluid products and the like, comprising:
a container shaped to receive and retain a fluid product in an interior portion thereof, and including a bottom portion with a discharge aperture therethrough, said container having a multi-piece construction comprising a pouch portion and a bottom panel defining said bottom portion;
a self-sealing closure comprising a marginal flange portion and a head portion with an orifice extending therethrough, which opens to permit fluid flow therethrough in response to communication with a predetermined discharge pressure, said closure is molded in-situ directly on said container bottom portion from a thermoplastic material and is formed on said container bottom panel; and wherein
said closure is formed on said container bottom panel before connecting the same to said pouch portion of said container, said flange portion of said closure is positioned about and encloses said discharge aperture in said container bottom portion, and said flange portion is constructed from a thermoplastic material which is heat fused to said container bottom portion to form a secure interconnection and fluid seal therebetween, whereby the liquid product in said container can be dispensed either directly through said closure orifice by applying said discharge pressure to the interior portion of said container, or indirectly by inserting a straw through said closure orifice and applying a vacuum to said straw.

30. A dispensing package as set forth in claim 29, wherein:
said container bottom panel is formed from an elongate strip of thin, heat sealable material;
said container pouch portion is formed from an elongate strip of heat sealable material; and
said container bottom panel is connected to said container pouch portion by a heat sealed connection.

31. A dispensing assembly for fluid product packages and the like, of the type including a container shaped to receive and retain a fluid product in an interior portion thereof, with a discharge aperture therethrough; said assembly comprising:
a self-sealing closure having a marginal flange portion and a head portion with an orifice extending therethrough which opens to permit fluid flow therethrough in response to communication with a predetermined discharge pressure;
a dispensing panel constructed from a thermoplastic material which includes a discharge aperture therethrough; and wherein
said flange portion of said closure is positioned about and encloses said discharge aperture, and said closure is constructed as a single, uninterrupted piece from a thermoplastic material which is heat fused to said dispensing panel to form a secure interconnection and fluid seal therebetween.

32. A dispensing assembly as set forth in claim 31, wherein:
said closure is molded in-situ directly on said dispense panel from a thermoplastic material.

33. A dispensing assembly as set forth in claim 32, wherein:
said closure orifice comprises at least two mutually intersecting slits through said head portion of said closure.

34. A dispensing assembly as set forth in claim 33, wherein:
said closure includes a resiliently flexible connector sleeve portion with one end portion thereof connected with said flange portion, and an opposite end portion thereof connected with said head portion;
said closure assumes a generally concave orientation when said orifice is in a fully closed condition; and
said connector sleeve has a generally J-shaped, longitudinal, cross-sectional shape.

35. A method for making dispensing packages for fluid products and the like, comprising:
forming a container shaped to receive and retain a fluid product in an interior portion thereof;
forming a discharge aperture through the container;
providing a self-sealing closure constructed as a single, uninterrupted piece from a thermoplastic material and of the type having a marginal flange portion and a head portion with an orifice extending therethrough, which opens to permit fluid flow therethrough in response to communication with a predetermined discharge pressure;
positioning the flange portion of the closure about the discharge aperture in the container to enclose the same; and heat fusing the flange portion of the closure to the container to form a secure interconnection and fluid seal therebetween.

36. A method as set forth in claim 35, wherein:

said providing and positioning steps comprise molding the closure in-situ directly on the container from a thermoplastic material.

37. A method as set forth in claim 36, wherein:

the container has a multi-piece construction comprising a pouch portion and a panel portion; and said molding step comprises molding the closure on one of the pouch portion and the panel portion before interconnecting the same.

38. A method as set forth in claim 37, including:

forming the panel portion from an elongate strip of thin heat sealable material.

39. A method as set forth in claim 38, including:

forming the pouch portion from an elongate strip of heat sealable material.

40. A method as set forth in claim 39, including:

forming the orifice in the head portion of the closure.

41. A method as set forth in claim 35, wherein:

the container has a multi-piece construction comprising a pouch portion and a panel portion in one of which the discharge aperture is positioned; and said molding step comprises molding the closure on the one of the pouch portion and the panel portion before interconnecting the same.

42. A method as set forth in claim 35, including:

forming the container from an elongate strip of heat sealable material.

43. A method as set forth in claim 35, including:

forming the orifice in the head portion of the closure.

44. A method as set forth in claim 43, wherein:

said orifice forming step is performed after said heat fusing step.

45. A method for making dispensing packages and the like, comprising:

providing an elongate strip of heat sealable material for forming at least dispense panels of associated containers of the type including reservoirs;

forming apertures in the strip to define therein package discharge openings;

molding in-situ thermoplastic closures directly on the strip; the closures having head portions, and marginal flange portions which are formed about and enclose the discharge openings in the strip;

forming orifices in the head portions of the closures which open to permit fluid flow therethrough in response to communication with a predetermined discharge pressure;

cutting the strip to form dispense panel assemblies, wherein each comprises at least one of the dispense panels with at least one of the closures molded thereon;

connecting the dispense panel assemblies with the reservoirs to form dispensing packages of the type wherein liquid product in each of the containers can be dispensed either directly through the closure orifice by applying pressure to the container, or indirectly by inserting a straw through the closure orifice and applying a vacuum to the straw.

46. A method as set forth in claim 45, including:

said molding step includes forming the closures with resiliently flexible connector sleeve portions.

\* \* \* \* \*